July 29, 1924.
J. J. EHMEN
1,502,718
ANTISLIPPING DEVICE
Filed Feb. 17, 1923
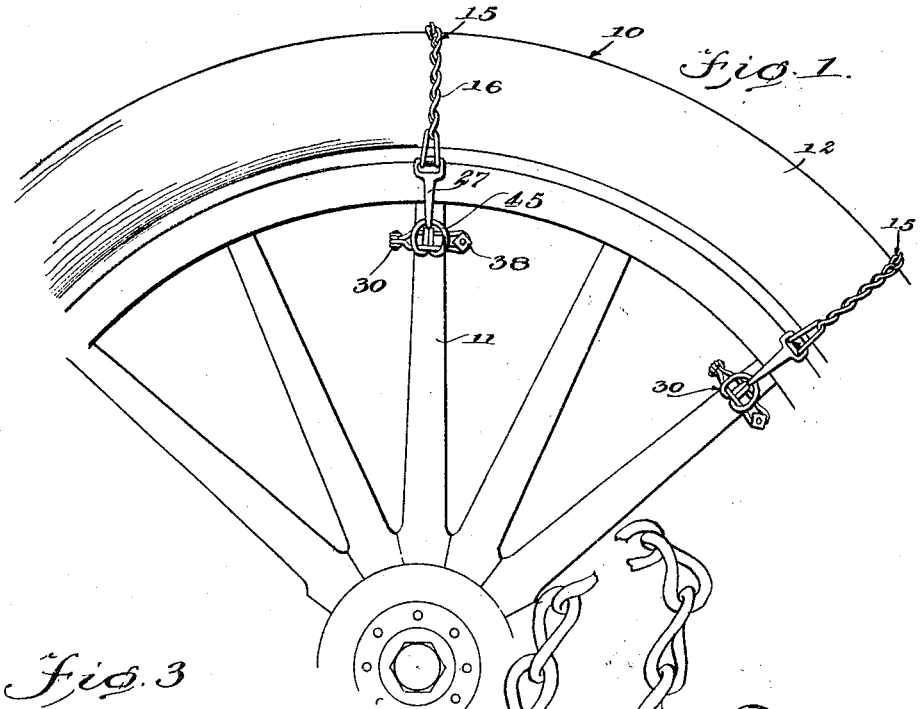
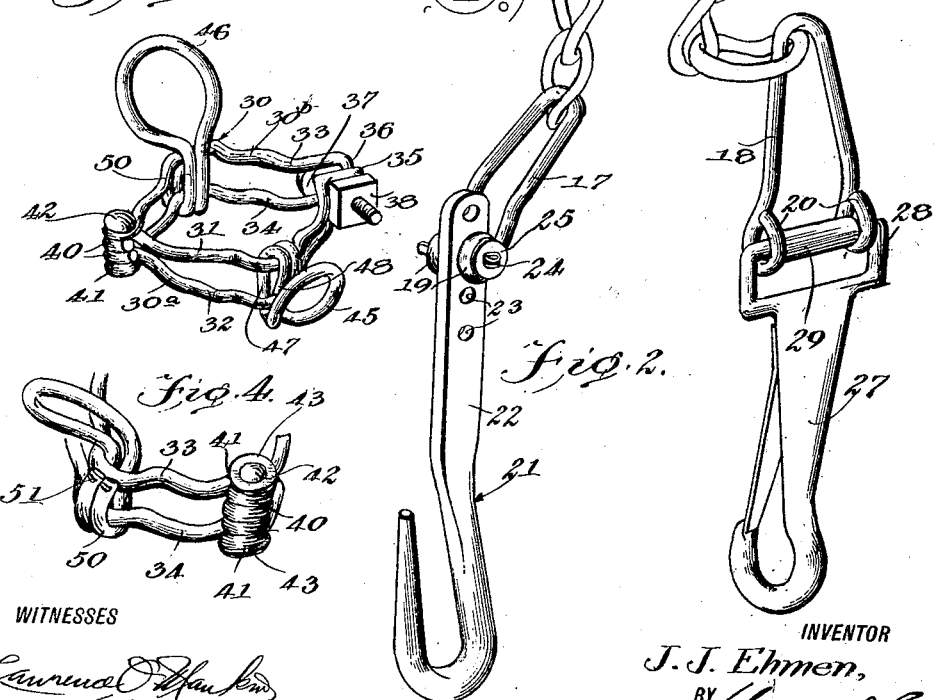
WITNESSES
INVENTOR
J. J. Ehmen,
BY
ATTORNEYS Patented July 29, 1924.

1,502,718

UNITED STATES PATENT OFFICE.

JOHN J. EHMEN, OF CLAYTON, ILLINOIS, ASSIGNOR OF ONE-THIRD TO JOHN J. EMMINGA, OF GOLDEN, ILLINOIS.

ANTISLIPPING DEVICE.

Application filed February 17, 1923. Serial No. 619,733.

*To all whom it may concern:*

Be it known that I, JOHN J. EHMEN, a citizen of the United States, and a resident of Clayton, in the county of Adams and State of Illinois, have invented certain new and useful Improvements in Antislipping Devices, of which the following is a specification.

This invention relates to an anti-slipping device for use with wheels and is particularly although not necessarily adapted for use with the pneumatic tired wheels of an automobile or the like.

The object of the present invention is to provide a device of this character which may be readily applied to or taken from the wheel and which when on the wheel holds the anti-slipping chains or traction elements in proper position preventing slapping movement or other undesirable movements of the same and also preventing the chain from injuring the tire or other elements of the vehicle and holding it in the field or sphere of most efficient action.

Another object is to provide a device of this character with these advantages and also being of simple and durable construction, reliable in operation and susceptible of convenient and comparatively inexpensive manufacture from materials and with facilities ordinarily available.

Other objects and advantages of the invention reside in certain novel features of the construction, combination and arrangement of parts which will be hereinafter more fully described and particularly pointed out in the appended claims, reference being had to the accompanying drawings forming part of this specification, and in which:

Figure 1 is a fragmentary view in side elevation showing a portion of an automobile wheel equipped with the anti-slipping devices constructed in accordance with the present invention;

Figure 2 is a perspective view, showing the anti-slipping chain and the associated hooks;

Figure 3 is a similar view of the clamp or spoke connector; and

Figure 4 is a fragmentary view, illustrating the manner in which the hook engaging loops are associated with the clamp.

Referring to the drawings wherein for the sake of illustration is shown the preferred embodiment of the invention, the numeral 10 designates generally a wheel which may be an automobile wheel and which preferably includes spokes 11 and a pneumatic tire 12.

The anti-slipping devices which constitute the present invention are designated generally at 15 and are applied at intervals around the tire or wheel, as shown in Figure 1. These anti-slipping devices are all of identical construction and each includes a chain 16 extending transversely around the tire and having end links 17 and 18, each of the end links being provided with a pair of apertured eyes, designated at 19 and 20 respectively. The members of each pair of eyes are formed by bending the terminals of the wire which constitutes the end link into circular form and the members of each pair are also arranged in spaced relation and in axial alinement. A hook, designated generally at 21, is associated with each end link 17, the flat shank 22 of the hook being provided with a series of openings 23 adapted to be selectively alined with the apertures of the eyes 19. A cotter pin 24 is inserted through the eyes and through the alined opening of the shank of the hook and serves to pivotally connect the hook 21 with the end link 17. Washers 25 may be associated with the cotter pin, as shown in Figure 2, if desired. A snap hook 27 is connected with the end link 18, the snap hook having an attaching frame 28 engaged with the eyes 20 of the end link 18. A split sleeve 29 is associated with the attaching frame 28 to prevent accidental displacement of the hook 27.

A spoke connector or clamp, designated generally at 30 is provided for each chain 16. Each of the clamps 30 comprise two sections, designated at $30^a$ and $30^b$, each section being made up of a single piece of wire looped or doubled upon itself to provide upper and lower arms, the arms of the section 30ᵃ being designated at 31 and 32 and the arms of the section 30ᵇ being designated at 33 and 34. The bights of the loops are indicated at 35 and 36, and these bights serve to connect the upper and lower arms. Also the portions of the sections 30ᵃ and 30ᵇ adjacent the bights 35 and 36 are offset or extended angularly with respect to the main portions of the sections so that the bights together with the adjacent offset portions of the arms provide spaced bolt seats or sockets adapted to coact with a bolt 37 and nut 38 for securing the clamp on the spoke as will presently appear. The terminals or free ends of the length of wire which makes up each section are bent to form apertured ears, the apertured ears of the section 30ᵃ being designated at 40 and the apertured ears of the section 30ᵇ being designated at 41. These apertured ears are arranged in axial alinement, being interfitted for this purpose and through the alined openings of the ears 40 and 41 a hinge pin 42 is inserted, the hinged pin being suitably secured in position as by means of a nut or the like and washers 43 being interposed between the nut in the adjacent eye at one end and the head of the hinged pin and the eye adjacent thereto at the other end.

Hook engaging loops, indicated at 45 and 46, are associated with the sections 30ᵃ and 30ᵇ, respectively, of the clamp. The loops 45 and 46 are constructed of resilient wire and the loop 45 has extensions 47 which extend from the loop down around the lower arm 32 and then up around the upper arm 31, the terminals of the extensions bearing upon the upper side of the lower arm 32, as indicated at 48. In this manner the extensions completely encompass the arms and serve not only to connect the loop 45 with the arms but also to maintain the arms in proper spaced relation and to brace and strengthen them. Moreover, the loop 45 extends out of way of the section 30ᵃ of the clamp for a purpose which will presently appear. The loop 46 includes extensions 50 disposed to lie against the inner faces or sides of the arms 33 and 34 of the section 30ᵇ. The extensions 50 are then bent up around the arm 34 and the terminals of these extensions 50 are engaged with the upper arms 33, as indicated at 51 in Figure 4. In this manner the extensions 50 serve both to connect the loop 46 to the section 30ᵇ of the clamps and also to brace and strengthen the arms 30 and 34 and hold these arms in proper spaced relation.

In practice the clamps 30 are arranged with their sections 30ᵃ and 30ᵇ embracing the spoke and in clamping engagement with the spoke under the action of the bolt 37 and nut 38. Preferably the head of the bolt 37 is slotted so that this head may coact with a screw driver or the like, the nut 28 being held from turning by engaging the arms 31 and 32. When the clamp has been properly positioned on the spoke, the hook 21 is engaged with the loop 46 of the clamp and the chain 16 is then extended around the tire and the snap hook 27 is brought into engagement with the loop 45. The manner in which the loop 45 is arranged with respect to the clamp provides for the requisite clearance for accommodating the spring clip of the snap fastener. The shank 22 of the hook 21 is adjustable in its connection with the end link 17 thus the chain may be tightened or the length thereof may be varied to suit the requirements of different makes of tires.

I claim:

1. In an anti-slipping device of the character described, a chain, means for securing the chain to a spoke, including a spoke connector comprising a pair of clamping sections, each section being made up of a single piece of wire looped to form upper and lower arms, the portions of said sections adjacent the bights of the loops being offset to provide seats and the terminals of the wire making up each loop being formed to provide apertured ears, a hinge pin coacting with the apertured ears for pivotally connecting the sections together, a bolt and nut coacting with the seats for moving the sections into clamping engagment with the spoke, and a chain engaging loop carried by each of said clamping sections.

2. An anti-slipping device for use on wheels comprising a chain adapted to be extended transversely around the tire of the wheel, a snap hook connected to one of the end links of the chain, the other end link having a pair of eyes, a hook having a shank provided with a series of openings adapted to be selectively alined with the eyes of the end link, a pivot pin cooperable with the eyes and the alined opening of the shank whereby the hook is adjustably connected to the chain, said hook also having an open bill and a spoke connector including sections, and means for clamping the sections in engagement with the spoke, said sections carrying loops adapted to be engaged with the snap hook and with the open bill.

3. In an anti-slipping device of the character described, a chain, means for securing the chain to a spoke including a spoke connector comprising a pair of clamping sections, each section being made up of a single piece of wire looped to form upper and lower arms, the portions of said sections adjacent the bights of the loops being offset to provide seats and the terminals of the wire making up each loop being formed to provide apertured ears, a hinge pin coacting with the apertured ears for pivotally connecting the sections together, a bolt and nut coacting with the seats for moving the sections into clamping engagement with the spoke and chain engaging loops constructed of pieces of wire extended around the arms of the sections and having their terminals engaging said arms whereby said loops not only serve as means for connecting the chain to the spoke connector but also serve to embrace and strengthen the arms of each spoke connector and maintain said arms in proper position.

JOHN J. EHMEN.